US010294038B2

(12) United States Patent
Hou

(10) Patent No.: US 10,294,038 B2
(45) Date of Patent: May 21, 2019

(54) CONVEYOR BELT MONITORING SYSTEM

(71) Applicant: The Yokohama Rubber Co., LTD., Minato-ku, Tokyo (JP)

(72) Inventor: Gang Hou, Hiratsuka (JP)

(73) Assignee: The Yokohama Rubber Co., LTD. (JP)

(*) Notice: Subject to any disclaimer, the term of this patent is extended or adjusted under 35 U.S.C. 154(b) by 0 days.

(21) Appl. No.: 15/742,494

(22) PCT Filed: May 13, 2016

(86) PCT No.: PCT/JP2016/064285
§ 371 (c)(1),
(2) Date: Jan. 5, 2018

(87) PCT Pub. No.: WO2017/033506
PCT Pub. Date: Mar. 2, 2017

(65) Prior Publication Data
US 2018/0201449 A1 Jul. 19, 2018

(30) Foreign Application Priority Data

Aug. 24, 2015 (JP) ................... 2015-164730

(51) Int. Cl.
*B65G 43/02* (2006.01)
*B65G 23/44* (2006.01)
(Continued)

(52) U.S. Cl.
CPC ............ *B65G 43/02* (2013.01); *B65G 15/08* (2013.01); *B65G 15/64* (2013.01); *B65G 23/44* (2013.01);
(Continued)

(58) Field of Classification Search
None
See application file for complete search history.

(56) References Cited

U.S. PATENT DOCUMENTS 7,634,949 B2 * 12/2009 Lodge .................... G01L 5/047
73/828
7,748,521 B2 * 7/2010 Aizawa .................. B65G 43/02
198/810.02
(Continued)

FOREIGN PATENT DOCUMENTS

JP S51-043576 4/1976
JP 2001-240231 9/2001
(Continued)

OTHER PUBLICATIONS

International Search Report for International Application No. PCT/JP2016/064285 dated Aug. 9, 2016, 4 pages, Japan.

*Primary Examiner* — Kavel Singh
(74) *Attorney, Agent, or Firm* — Thorpe North & Western

(57) ABSTRACT

Provided is a conveyor belt monitoring system that determines whether or not an abnormality has occurred in the conveyor belt by successively detecting elongation of a running conveyor belt using an elongation detection mechanism, by successively detecting tension acting on a core layer forming the conveyor belt using a tension detection mechanism, and, on the basis of data obtained therefrom, monitoring the presence/absence of the abnormality in the conveyor belt using a control unit.

2 Claims, 5 Drawing Sheets

(51) Int. Cl.
  *B65G 15/08*  (2006.01)
  *B65G 39/18*  (2006.01)
  *B65G 15/64*  (2006.01)
  *B65G 43/08*  (2006.01)
  *B29C 37/00*  (2006.01)

(52) U.S. Cl.
  CPC ............. *B65G 39/18* (2013.01); *B65G 43/08* (2013.01); *B29C 2037/90* (2013.01); *B65G 2203/0275* (2013.01); *B65G 2203/042* (2013.01)

(56) References Cited

U.S. PATENT DOCUMENTS

| | | | |
|---|---|---|---|
| 7,894,934 B2 * | 2/2011 | Wallace | B65G 43/00 700/230 |
| 9,227,793 B2 * | 1/2016 | Rathmann | B65G 43/02 |

FOREIGN PATENT DOCUMENTS

| | | |
|---|---|---|
| JP | 2005-106761 | 4/2005 |
| JP | 2006-044853 | 2/2006 |
| JP | 2010-052927 | 3/2010 |
| WO | WO 2005/005292 | 1/2005 |

\* cited by examiner

CONVEYOR BELT MONITORING SYSTEM

TECHNICAL FIELD

The present technology relates to a conveyor belt monitoring system, and more particularly relates to a conveyor belt monitoring system capable of accurately detecting signs of the occurrence of failure, such as rupture, in a conveyor belt.

BACKGROUND ART

Various objects, including mineral resources such as iron ore and limestone, are conveyed by a conveyor belt. Those objects to be conveyed are fed onto the surface of an upper cover rubber of the conveyor belt from a hopper or from another conveyor belt. Here, for example, if the upper cover rubber is damaged by the object to be conveyed and a core layer, which bears the tension of the conveyor belt, is damaged as a result, the core layer becomes unable to sufficiently bear the tension. If the core layer is ruptured, the conveyor belt cannot be operated, and there is no choice but to discontinue the conveying operation. A significant amount of time and expense are required to repair or replace the ruptured conveyor belt and restore the operation. Thus, various technologies for detecting such failure of the conveyor belt at an early stage have been proposed (see Japanese Unexamined Patent Application Publication No. 2010-52927, for example).

However, the conventional methods proposed adopt a system in which elongation of the conveyor belt is monitored, and an abnormality is detected on the basis of the acquired elongation data. However, even when the elongation is significantly large, some conveyor belts (core layers) do not rupture easily. Further, the elongation of the conveyor belt is obtained as a total of an elongation of the core layer and a shift amount of an endless part (a connecting part) of the core layer. Thus, even when conveyor belts share identical specifications, variations occur in the elongation of the conveyor belt depending on a combination of the elongation and the shift amount. Therefore, in some cases, whether or not the conveyor belt is likely to rupture soon cannot be determined simply on the basis of the elongation of the conveyor belt. There has thus been room for improvement in relation to accurately detecting the signs of rupture and the like of the conveyor belt simply by monitoring the elongation of the conveyor belt.

SUMMARY

The present technology provides a conveyor belt monitoring system capable of accurately detecting signs of the occurrence of failure, such as rupture, in a conveyor belt.

A conveyor belt monitoring system of the present technology includes: an elongation detection mechanism configured to successively detect elongation of a conveyor belt while the conveyor belt is running; a tension detection mechanism configured to successively detect tension acting on a core layer forming the conveyor belt; and a control unit into which data obtained from the elongation detection mechanism and the tension detection mechanism are input, the control unit being further configured to monitor a presence and absence of an abnormality of the conveyor belt on the basis of the input data.

According to the present technology, since the tension acting on the core layer is detected as well as the elongation of the running conveyor belt, signs of an occurrence of failure, such as rupture, in the conveyor belt can be accurately detected compared with a case in which only the data of the elongation of the conveyor belt are used.

Here, for example, the elongation detection mechanism detects the elongation in a plurality of positions arranged at predetermined intervals in a width direction of the conveyor belt. As a result, an abnormal elongation that is unevenly distributed in the width direction of the conveyor belt can be detected. In this way, signs of the rupture or the like of the conveyor belt can be even more accurately detected.

The elongation detection mechanism can also detect the elongation in a plurality of positions arranged at predetermined interval in a longitudinal direction of the conveyor belt. As a result, an abnormal elongation that is unevenly distributed in the longitudinal direction of the conveyor belt can be detected. In this way, signs of the rupture or the like of the conveyor belt can be even more accurately detected.

Elongation of an endless part and of a non-endless part of the core layer is detected as the elongation of the conveyor belt, for example. As a result, a shift amount of the endless part and the elongation of the non-endless part are more easily distinguished and ascertained. This is advantageous in terms of accurately detecting signs of the rupture or the like of the conveyor belt.

The tension detection mechanism can also successively detect the tension acting on the core layer on the basis of power consumption of the running conveyor belt. With this configuration, the tension can be detected in a relatively simple manner.

DETAILED DESCRIPTION

Figure 1:
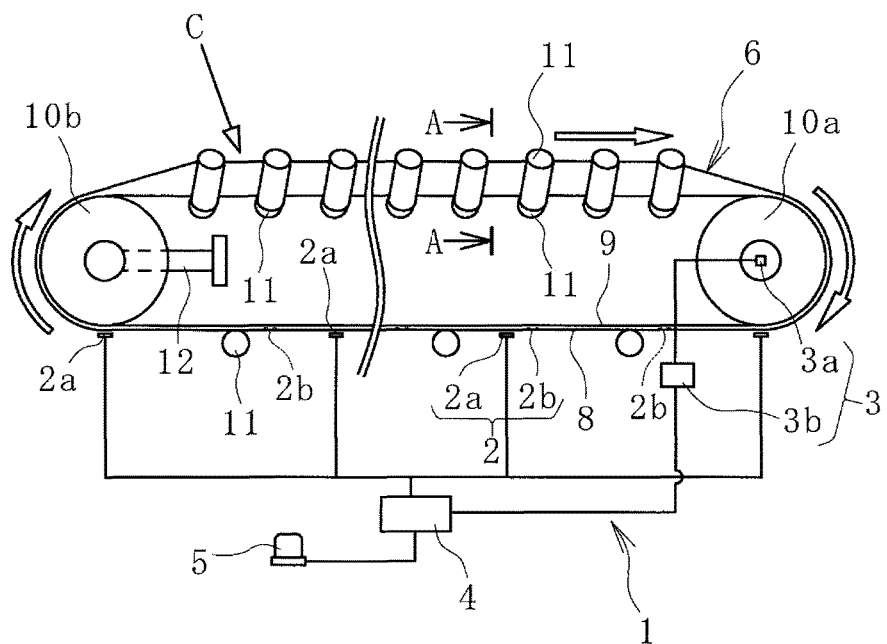
FIG. 1 is an explanatory diagram illustrating a conveyor belt monitoring system of the present technology in a side view.

A conveyor belt monitoring system of the present technology will be described below on the basis of an embodiment illustrated in the drawings.

Figure 2:
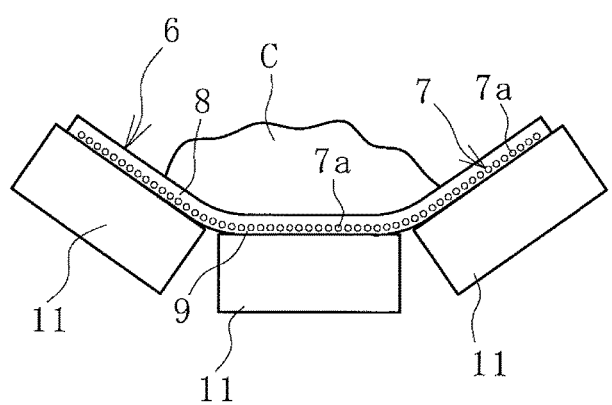
FIG. 2 is a cross-sectional view taken along A-A in FIG. 1.

A conveyor belt monitoring system 1 (hereinafter referred to as a system 1) of the present technology illustrated in FIG. 1 is applied to a conveyor belt 6 of an actual conveyor belt line. As illustrated in FIG. 2, the conveyor belt 6 to be monitored is configured by a core layer 7 made of canvas or steel cords, and an upper cover rubber 8 and a lower cover rubber 9 that sandwich the core layer 7 therebetween. The core layer 7 is a member that bears a tension that causes the conveyor belt 6 to be stretched. The conveyor belt 6 is further configured by adding other necessary members as appropriate.

The conveyor belt 6 is mounted between a driving pulley 10a and a driven pulley 10b and stretched therebetween at a predetermined tension. Between the driving pulley 10*a* and the driven pulley 10*b*, the conveyor belt 6 is supported by support rollers 11 arranged at appropriate intervals in the belt longitudinal direction.

The lower cover rubber 9 is supported by the support rollers 11 on a carrier side of the conveyor belt 6, and the upper cover rubber 8 is supported by the support rollers 11 on a return side. Three of the support rollers 11 are arranged on the carrier side of the conveyor belt 6 in the belt width direction, and the conveyor belt 6 is supported in a recessed shape having a predetermined trough angle by these support rollers 11.

The driving pulley 10*a* is driven to rotate by a drive motor. A take-up mechanism 12 causes the driven pulley 10*b* to move and causes the tension to act on the conveyor belt 6 (core layer 7) by changing the distance between the driving pulley 10*a* and the driven pulley 10*b*.

Figure 3:
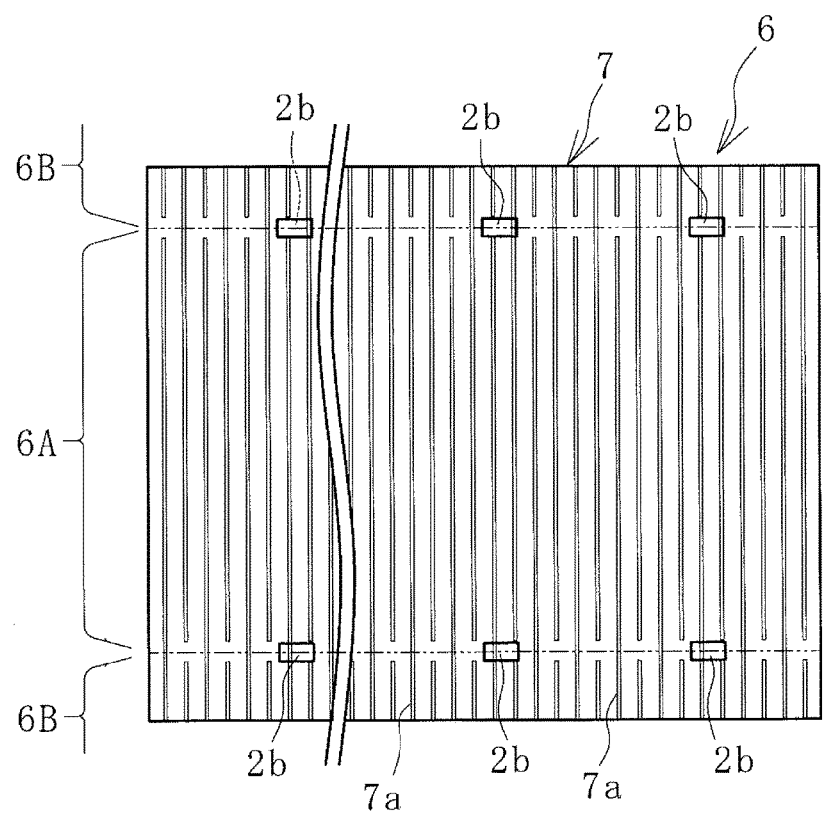
FIG. 3 is an explanatory diagram illustrating an arrangement of chips of an elongation detection mechanism in an endless part, while illustrating the interior of a conveyor belt in a plan view.
Figure 4:
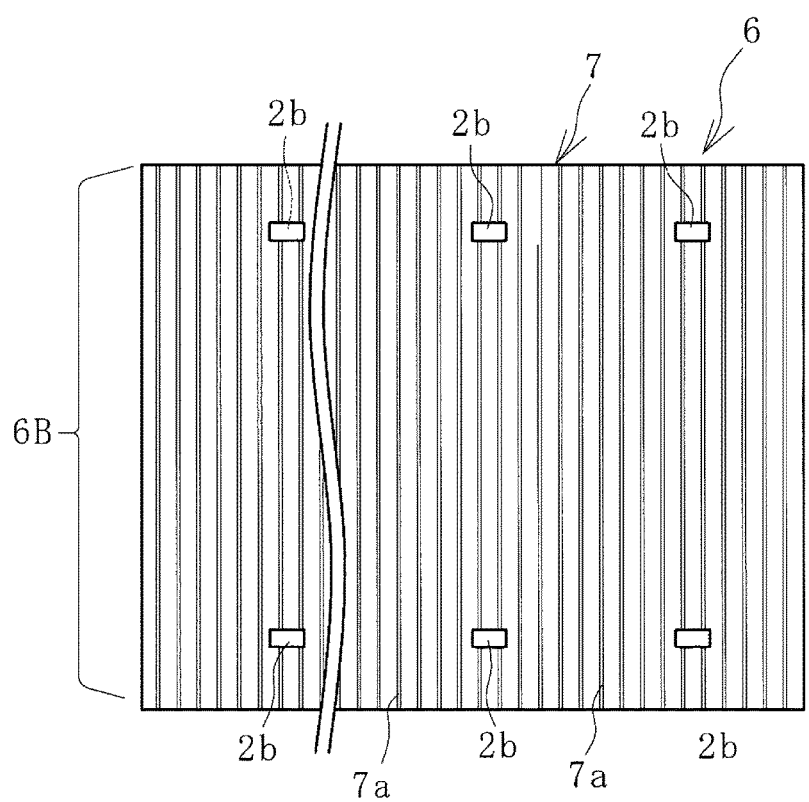
FIG. 4 is an explanatory diagram illustrating an arrangement of the chips of the elongation detection mechanism in a non-endless part, while illustrating the interior of the conveyor belt in a plan view.

End portions of the core layer 7 in the longitudinal direction are joined such that the conveyor belt 6 has an appropriate length. Therefore, in the conveyor belt 6, a portion illustrated in FIG. 3 in which the core layer 7 is joined in the longitudinal direction (an endless part 6A), and a non-endless part 6B illustrated in FIG. 4 are present adjacent to each other. In this conveyor belt 6, the core layer 7 is formed by a plurality of steel cords 7*a* that are arranged side by side in the belt width direction. In the endless part 6A, the steel cords 7*a* extending from the non-endless parts 6B that face each other in the belt longitudinal direction are alternately inserted between the adjacent steel cords 7*a* in the width direction.

When the core layer 7 is formed of canvas, a known structure is adopted in the endless part 6A, in which the canvas extending from the non-endless parts 6B, which face each other in the belt longitudinal direction, is joined so as to form a stepped shape, for example. In the non-endless parts 6B, the core layer 7 is continuously formed without any joint, but the endless part 6A forms a joint of the core layer 7. Thus, differences arise between the endless part 6A and the non-endless parts 6B, in terms of the elongation of the conveyor belt 6 (core layer 7) and the tension acting on the core layer 7.

This system 1 is provided with an elongation detection mechanism 2 that detects the elongation of the conveyor belt 6, a tension detection mechanism 3 that detects the tension acting on the core layer 7, and a control unit 4 into which data obtained by the elongation detection mechanism 2 and the tension detection mechanism 3 are successively input. Data relating to a tolerance range for the elongation of the conveyor belt 6 and a tolerance range for the tension that can be borne by the core layer 7 are input into the control unit 4 in advance. Warning means 5, the operation of which is controlled by the control unit 4, is further provided in this embodiment. Examples of the warning means 5 include a warning lamp, a warning device, and the like.

The elongation detection mechanism 2 is provided with sensor units 2*a* that are disposed in proximity to the conveyor belt 6 and chips 2*b* that are installed in the conveyor belt 6. The chips 2*b* are embedded in the endless part 6A and the non-endless part 6B of the conveyor belt 6, for example. The sensor units 2*a* are arranged so as to face positions passed by the chips 2*b* when the conveyor belt 6 is running. In this embodiment, the sensor units 2*a* are disposed in proximity to the surface of the upper cover rubber 8 on the return side of the conveyor belt 6.

Further, in this embodiment, the chips 2*b* are installed in the endless part 6A and the non-endless part 6B in a plurality of positions at intervals in the belt width direction, and in a plurality of positions at intervals in the belt longitudinal direction. The sensor units 2*a* are provided in a plurality of positions at intervals in the belt width direction, and in a plurality of positions at intervals in the belt longitudinal direction. Detection data from the sensor units 2*a* are input into the control unit 4. The sensor units 2*a* and the control unit 4 are connected with each other via a wired or wireless connection.

Note that the arrangement position of each of the chips 2*b* in the conveyor belt 6 is input into the control unit 4 in advance. Further, the running speed of the conveyor belt 6 is successively input into the control unit 4.

The tension detection mechanism 3 includes a sensor unit 3*a* that detects a power consumption of the drive motor that drives the driving pulley 10*a* to rotate, and a calculation unit 3*b* that calculates the tension acting on the core layer 7 on the basis of the detected power consumption. A relationship between the power consumption of the drive motor, which is calculated on the basis of empirical data and the like, and the tension acting on the core layer 7 is input into the calculation unit 3*b* in advance. Thus, when the power consumption of the drive motor is input into the calculation unit 3*b*, the tension acting on the core layer 7 at that time can be successively calculated. The calculation data from the calculation unit 3*b* are input into the control unit 4. The calculation unit 3*b* and the control unit 4 are connected with each other via a wired or wireless connection.

Next, a method of monitoring the presence and absence of an abnormality of the conveyor belt 6 using the system 1 will be described.

In an actual conveyor belt line, an object to be conveyed is fed onto the surface of the upper cover rubber 8 by a hopper and the like, while the conveyor belt 6 is running. While the conveyor belt 6 is running, the sensor units 2*a* respectively detect the chips 2*b* passing by. The running speed of the conveyor belt 6 and the arrangement positions of the chips 2*b* in the conveyor belt 6 are already known. Thus, on the basis of the detection data of the sensor units 2*a*, the elongation of the conveyor belt 6 (core layer 7) can be successively detected at a time at which a section between the chips 2*b* that are adjacent to each other in the longitudinal direction passes the sensor unit 2*a* that makes the detection.

Further, the sensor unit 3*a* of the tension detection mechanism 3 successively detects the power consumption required to rotate the driving pulley 10*a*, and the calculation unit 3*b* successively calculates the tension acting on the core layer 7. According to this type of configuration in which the tension acting on the core layer 7 is successively detected on the basis of the power consumption required for the running of the conveyor belt 6, the tension can be detected in a relatively simple manner.

The tension acting on the core layer 7 can also be detected by another method. For example, a take-up mechanism 12 can be configured, and the tension can be detected on the basis of an axial force (a force acting in the lateral direction in FIG. 1) that acts on a shaft that causes the driven pulley 10*b* to move in the belt longitudinal direction (in the lateral direction in FIG. 1). This tension can be detected by one method or a plurality of different methods.

Figure 5:
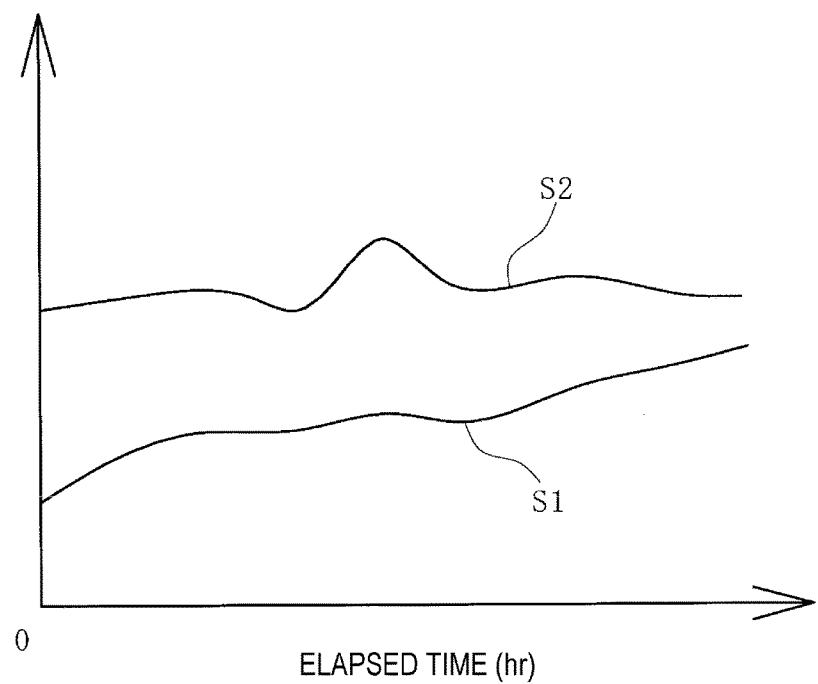
FIG. 5 is a graph showing time-dependent changes in detected elongation of the conveyor belt and tension acting on a core layer.

As described above, by using the elongation detection mechanism 2 and the tension detection mechanism 3, time-dependent data S1 of the elongation of the conveyor belt 6 and time-dependent data S2 of the tension acting on the core layer 7 can be obtained, as illustrated in FIG. 5. On the basis of these data S1 and S2, the control unit 4 detects whether or not there is any sign of an occurrence of a failure, such as rupture, in the conveyor belt 6. Specifically, when both the data S1 and S2 are within the respective tolerance ranges set in advance, the control unit 4 determines that there is no sign of failure. On the other hand, when at least one of the data S1 and S2 are outside the tolerance ranges set in advance, the control unit 4 determines that there is a sign of failure. When it is determined that there is a sign of failure, the warning means 5 is caused to operate in order to inform an operator, a supervisor and the like of the fact that there is a risk of failure occurring.

As well as a configuration in which both the data S1 and S2 are compared with the respective tolerance ranges, another configuration can be adopted in which it is determined that there is a sign of failure when a significant change occurs, within a short period of time, in one of the data S1 and S2, without making a comparison with the tolerance range.

In this way, in the present technology, the obtained elongation data S1 and tension data S2 are utilized by successively detecting the tension acting on the core layer 7 as well as the elongation of the conveyor belt 6 that is running. Therefore, compared with a conventional technology that uses only the elongation data S1, this configuration is advantageous in terms of accurately detecting signs of the occurrence of failure, such as rupture, in the conveyor belt 6. At that time, since a section in which the elongation is larger than that of other sections can also be identified, a section in which a failure is likely to occur can also be ascertained. As a result, a failure can be promptly inspected or repaired, for example.

If the conveyor belt 6 is ruptured in a state in which a large amount of an object to be conveyed C is loaded on the conveyor belt 6, a large number of human-hours are required to deal with the object to be conveyed C that has fallen, and to repair or replace the conveyor belt 6. However, if the section in which a failure is likely to occur can be ascertained in advance using the present technology, the conveyor belt 6 can be repaired or replaced after taking a measure such as reducing the amount of the object to be conveyed C on the conveyor belt 6, for example. Thus, a person skilled in the art can minimize damage without sustaining significant losses.

In this embodiment, the elongation detection mechanism 2 detects the elongation at the plurality of positions arranged in the width direction of the conveyor belt 6 at predetermined intervals. Thus, any abnormal elongation that is unevenly distributed in the width direction of the conveyor belt 6 can be detected. As a result, signs of the rupture or the like of the conveyor belt 6 can be even more accurately detected. It is preferable that the chips 2b be arranged over the entire width in the width direction of the conveyor belt 6 at a predetermined pitch. For example, three or more of the chips 2b are arranged in the width direction of the conveyor belt 6 at equal intervals.

As illustrated in FIG. 2, since the conveyor belt 6 runs while bending in a trough-like shape, the elongation of the conveyor belt 6 and the tension acting on the core layer 7 significantly vary depending on the position in the belt width direction. Further, the occurrence of the rupture or the like of the conveyor belt 6 (core layer 7) originates from the weakest section. Thus, arranging the chips 2b at a central portion (a flat portion in FIG. 2) and at end portions (inclined portions in FIG. 2) of the conveyor belt 6 in the width direction and detecting the elongation, as in this embodiment, is extremely effective in terms of accurately detecting the signs of rupture or the like in the conveyor belt 6.

Further, in this embodiment, the elongation detection mechanism 2 detects the elongation at the plurality of positions that are arranged in the longitudinal direction of the conveyor belt 6 at the predetermined intervals. Thus, an abnormal elongation that is unevenly distributed in the longitudinal direction of the conveyor belt 6 can be detected. As a result, the signs of rupture or the like of the conveyor belt 6 can be even more accurately detected. It is preferable that the chips 2b be arranged over the entire length in the longitudinal direction of the conveyor belt 6 at the predetermined pitch, and that the elongation be detected at the sections of equal length over the entire length.

In this embodiment, the elongation of the endless part 6A and the non-endless part 6B of the conveyor belt 6 (core layer 7) are detected. Thus, the longitudinal-direction shift amount of the steel cords 7a in the endless part 6A and the elongation of the non-endless part 6B can be more easily distinguished and ascertained. For example, when the elongation of the endless part 6A has significantly increased even though the elongation of the non-endless part 6B has not increased, it can be determined that there is a possibility that a significant longitudinal-direction displacement of the steel cords 7a in the endless part 6A, namely so-called "pulling out" from the endless part 6A, has occurred. This is advantageous in terms of accurately detecting the signs of rupture or the like in the conveyor belt 6.

The invention claimed is:
1. A conveyor belt monitoring system, comprising:
an elongation detection mechanism configured to successively detect elongation of a conveyor belt while the conveyor belt is running;
a tension detection mechanism configured to successively detect tension acting on a core layer forming the conveyor belt; and
a control unit into which data obtained from the elongation detection mechanism and the tension detection mechanism are input,
the control unit being further configured to monitor a presence and absence of an abnormality of the conveyor belt on the basis of the input data;
wherein detecting the elongation of the conveyor belt comprises separately detecting elongation of an endless part of the core layer and elongation of a non-endless part of the core layer,
a portion in which the core layer is joined in the longitudinal direction being the endless part, the non-endless part being present adjacent to both sides in the longitudinal direction of the endless part, and the core layer in the non-endless part being continuously formed without any joint.
2. The conveyor belt monitoring system according to claim 1, wherein
the tension detection mechanism is further configured to successively detect the tension acting on the core layer on the basis of power consumption of the running conveyor belt.

* * * * *